(12) United States Patent
Kwak et al.

(10) Patent No.: US 9,174,540 B2
(45) Date of Patent: Nov. 3, 2015

(54) FAULT DIAGNOSING SYSTEM AND METHOD FOR COOLANT SWITCHING DEVICE FOR VEHICLE

(71) Applicant: Hyundai Motor Company, Seoul (KR)

(72) Inventors: Heon Young Kwak, Gyeonggi-do (KR); Ju Man Yoon, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/105,667

(22) Filed: Dec. 13, 2013

(65) Prior Publication Data

US 2015/0006017 A1 Jan. 1, 2015

(30) Foreign Application Priority Data

Jun. 28, 2013 (KR) ........................ 10-2013-0075175

(51) Int. Cl.
| | | |
|---|---|---|
| *G06F 7/00* | (2006.01) | |
| *B60L 3/04* | (2006.01) | |
| *B60H 1/00* | (2006.01) | |
| *B60L 11/18* | (2006.01) | |

(52) U.S. Cl.
CPC ... *B60L 3/04* (2013.01); *B60H 1/00* (2013.01); *B60H 1/00385* (2013.01); *B60H 1/00978* (2013.01); *B60L 11/1874* (2013.01); *B60H 2001/003* (2013.01); *B60L 11/1816* (2013.01); *Y02T 90/127* (2013.01); *Y02T 90/14* (2013.01)

(58) Field of Classification Search
CPC . Y02T 10/7005; Y02T 90/14; Y02T 10/7088; Y02T 90/127; B60L 11/1816; B60L 11/1874; B60H 2001/003; H01M 10/5004
USPC .......... 701/29.2, 22; 320/104, 109; 307/10.1; 180/65.1
See application file for complete search history.

(56) References Cited

U.S. PATENT DOCUMENTS

| | | | |
|---|---|---|---|
| 5,042,264 A | | 8/1991 | Dudley |
| 6,094,927 A | * | 8/2000 | Anazawa et al. ................ 62/239 |
| 8,534,400 B2 | * | 9/2013 | Stanek et al. ............ 180/65.265 |

FOREIGN PATENT DOCUMENTS

| | | |
|---|---|---|
| JP | 2006-313135 | 11/2006 |
| JP | 2008-153278 A | 7/2008 |
| JP | 2011-241773 | 12/2011 |
| JP | 2013-028323 A | 2/2013 |
| KR | 10-2002-0038377 | 5/2002 |
| KR | 10-2010-0071443 | 6/2010 |
| KR | 10-2012-0137916 | 12/2012 |

* cited by examiner

*Primary Examiner* — Gertrude Arthur Jeanglaude
(74) *Attorney, Agent, or Firm* — Mintz Levin Cohn Ferris Glovsky and Popeo, P.C.; Peter F. Corless

(57) ABSTRACT

A fault diagnosing system method for a coolant switching device for a vehicle are provided. The fault diagnosing system includes a first coolant pipe line that passes through an electronic device and an interior heating device. A second coolant pipe line branches off the first coolant pipe line and passes through a radiator. In addition, a coolant switching device is disposed at a branching point at which the second coolant pipe line branches off the first coolant pipe line and an on-board charger charges a vehicle battery and is disposed on the second pipe line. A controller is configured to determine a failure of the coolant switching device and stop the on-board charger from charging the vehicle battery when a temperature of the on-board charger is greater than a first set temperature and a temperature of the electronic device is less than a second set temperature.

12 Claims, 2 Drawing Sheets

FAULT DIAGNOSING SYSTEM AND METHOD FOR COOLANT SWITCHING DEVICE FOR VEHICLE

CROSS-REFERENCE TO RELATED APPLICATION

This application claims under 35 U.S.C. §119(a) priority to Korean Patent Application No. 10-2013-0075175 filed on Jun. 28, 2013, the entire contents of which are incorporated herein by reference.

BACKGROUND

1. Field of the Invention

The present invention relates to a fault diagnosing system and method for a coolant switching device for a vehicle that prevents damage to an on-board charger (OBC) when the coolant switching device fails and coolant is not supplied to the on-board charger.

2. Background of the Related Art

Environmentally friendly vehicles such as an electric vehicle or a plug-in hybrid vehicle, are equipped with an on-board charger which slowly charges a vehicle battery using electricity of about 110V or 220V. Since the on-board charger is an electronic device, it generates a substantial amount of heat when charging the vehicle battery with electricity which is input externally. When the heat is not controlled and dissipated, the performance and life span of the on-board charger, as well as the vehicle battery decrease. Therefore, coolant is passed through the on-board charger to control and dissipate the heat which is generated during charging of the vehicle battery, and to maintain the temperature below a predetermine temperature.

A coolant pipe line which passes through the on-board charger branches off a heating water pipe line connected to a heating device which is used to heat interior air of a vehicle. A coolant switching device is disposed at the branching point which causes the coolant to flow toward the heating device or toward the on-board charger. When the coolant switching device fails, the coolant may only flow toward the heating device and the temperature of the on-board charger may not be controlled due to the failure and therefore, the on-board charger may be damaged.

Conventionally, electric vehicles do not include equipment that determines whether the coolant switching device has failed. Accordingly, a risk exists that a driver may not notice a failure of the on-board charger.

The foregoing is intended merely to aid in the understanding of the background of the present invention, and is not intended to mean that the present invention falls within the purview of the related art that is already known to those skilled in the art.

SUMMARY

Accordingly, the present invention provides a fault diagnosing system and method for a coolant switching device for a vehicle that may diagnose a failure in the coolant switching device without using an additional device, by comparing temperatures of electronic devices on a coolant pipe line.

According to one aspect of the present invention, a fault diagnosing system for a coolant switching device for a vehicle may include: a first coolant pipe line that passes through an electronic device of the vehicle and a heating device installed within the vehicle; a second coolant pipe line, that branches off the first coolant pipe line at a first end thereof and joins with the first coolant pipe line at a second end thereof, and a middle portion of which extends to pass through a radiator; the coolant switching device installed at a branching point at which the second pipe line branches off the first pipe line; an on-board charger installed on the second coolant pipe line and in a position between the coolant switching device and the radiator and configured to charge a vehicle battery; and a controller configured to determine a failure of the coolant switching device and stop the on-board charger operation to end the charging of a vehicle battery when a temperature of the on-board charger is greater than a first set temperature and a temperature of an electronic device is less than a second set temperature.

The electronic device may include an electric power control unit and a driving motor. The second set temperature associated with the electronic device may include a set temperature for the driving motor and a set temperature for the electric power control unit, and the set temperature for the driving motor and the set temperature for the electric power control unit may be different. The controller may be configured to determine whether the on-board charger is operating before determining that the coolant switching device is malfunctioning (e.g., a failure of the coolant switching device), and may be configured to detect the temperature of the on-board charger and the temperature of the electronic device when the on-board charger is determined to be operating. The controller may be configured to detect the temperature of the on-board charger and the temperature of the electronic device when a predetermined time elapses when the operating determination of the on-board charger has made.

The fault diagnosing system may further include a water pump installed on the first coolant pipe line. In addition, the controller may be configured to first determine whether the water pump is operating before determining a failure of the coolant switching device, and may then be configured to detect the temperature of the on-board charger and the temperature of the electronic device when the water pump is determined to be operating.

According to another aspect of the present invention a fault diagnosing method using the fault diagnosing system according to the former aspect of the present invention may include detecting the temperature of the on-board charger and the temperature of the driving motor, and stopping the on-board charger from charging the vehicle battery after determining a failure of the coolant switching device when the detected temperature of the on-board charger is greater than the set temperature for the on-board charger and the detected temperature of the driving motor is less than the set temperature for the driving motor. The method may further include determining whether the water pump is operating before the detecting of the temperature.

According to a fault diagnosing system and method for a coolant switching device for a vehicle according to the present invention, it may be possible to determine whether the coolant switching device is malfunctioning without using an additional sensor or device, which reduces system cost and reduces a possibility of a failure in the coolant switching device, resulting in an improvement in durability of the on-board charger.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
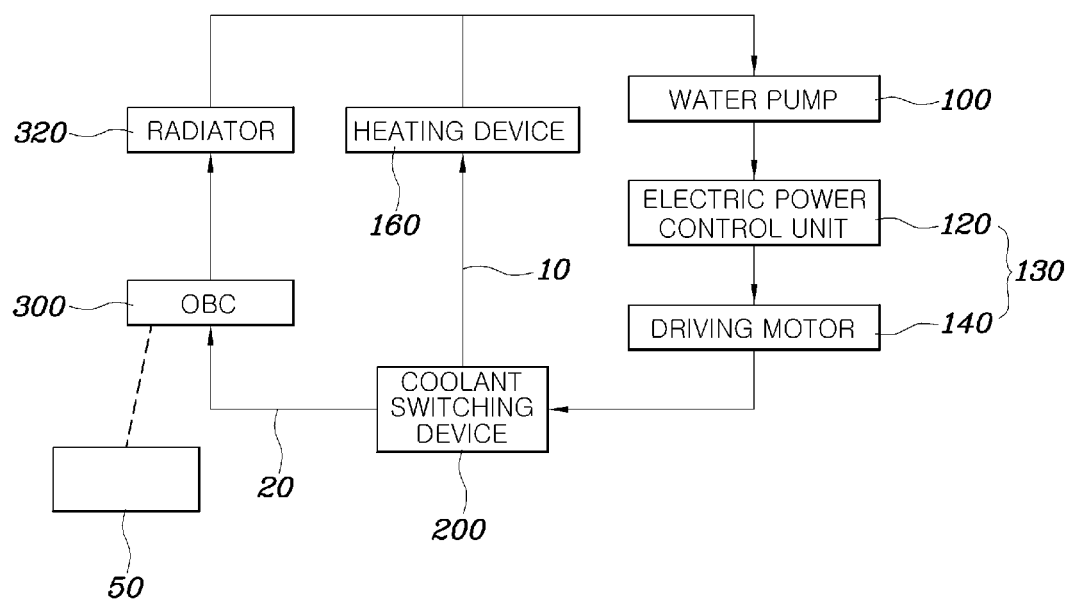
FIG. 1 is an exemplary diagram illustrating a fault diagnosing system for a coolant switching device for a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinbelow, exemplary embodiments of the present invention will be described in detail with reference to the accompanying drawings.

FIG. 1 is an exemplary diagram illustrating a fault diagnosing system for a coolant switching device 200 for a vehicle according to an exemplary embodiment of the present invention. The fault diagnosing system may include a first coolant pipe line 10, a second coolant pipe line 20, a coolant switching device 200, an on-board charger 300, and a controller 50.

The first coolant pipe line 10 may pass through an electronic device 130 of the vehicle and a heating device 160 configured to heat interior air of a vehicle. The second coolant pipe line 20 may branch off the first coolant pipe line 10 at one end thereof. A middle portion of the second coolant pipe line 20 may extend to pass through a radiator 320. The other end of the second coolant pipe line 20 may be joined with the first coolant pipe line. The coolant switching device 200 may be installed at the branching point at which the first coolant pipe line 10 branches off the second coolant pipe line 20.

The on-board charger 300 may be configured to charge a vehicle battery and may be disposed on the second coolant pipe line 20. The on-board charger may be installed in a position between the coolant switching device 200 and the radiator 320. The controller 50 may be configured to stop the charging operation of the on-board charger 300 to stop the charging of the vehicle battery. In addition, the controller 50 may be configured to determine a failure of the coolant switching device 200 (e.g., that the coolant switching device 200 is malfunctioning) when a temperature of the on-board charger 300, which is detected, is greater than a first set temperature and a temperature of the electronic device 130, which is detected, is less than a second set temperature. The electronic device 130 may include a driving motor 140 to drive the vehicle and an electric power control unit 120. The driving motor 140 is a motor that may generate driving force required to drive an electric vehicle or a hybrid vehicle. The Electric Power Control Unit (EPCU) 120 is a module in which an inverter and a high voltage divider are incorporated. The electronic device 130 may include devices that generate a substantial amount of heat during driving of a vehicle or charging of a vehicle battery. Accordingly, cooling equipment or a method of cooling is required for the electronic device 130.

The heating device 160 may include a heat pump. The heating device 160 may receive heat generated from the electronic device 130 and absorbed by coolant, via the first coolant pipe line 10, and may radiate the heat inside the vehicle to heat interior air of the vehicle. Further, the coolant switching device 200 may be configured to switch between the first coolant pipe line 10 and the second coolant pipe line 20 to cause the coolant to flow toward the heating device 160 when preheating the driving motor 140 is required or to heat the interior air of the vehicle using waste heat generated from the electronic device 130 and to cause the coolant to flow toward the second coolant pipe line 20 connected to the radiator 320 and the on-board charger 300 to discharge the heat to the exterior of the vehicle when the driving motor does not require preheating or to heat the interior air of the vehicle.

The controller 50 may be installed as a separate device, or combined with another device such as an engine control unit (ECU). The controller 50 may be configured to determine whether the on-board charger 300 is operating before determining that the coolant switching device 200 is malfunctioning. The controller 50 may be configured to detect the temperatures of the on-board charger 300 and the electronic device 130 when the on-board charger 300 is determined to be operating.

Accordingly, when the on-board charger 300 is not operating, even though the coolant switching device 200 has undergone sticking and the coolant may not be supplied to the second coolant pipe line 20, the on-board charger 300 may not be damaged since the on-board charger 300 may be prevented from overheating. Accordingly, by determining whether the on-board charger 300 is operating before detecting the temperatures of the on-board charger 300 and the electronic device 130, it may be possible to avoid unnecessary operations of the controller, thus preventing resources from being wasted.

A time lag may be set between the operation determine of the on-board charger 300 and the detection of the temperature of the electronic device 130 since the temperature of the on-board charger 300 may not rise to the extent that the on-board charger 300 is damaged until a certain time period has elapsed since the starting of the operation of the on-board charger 300. Additionally, the time lag may be calculated through experiments. Since the on-board charger 300 may be prevented from being damaged by overheating until a predetermined time has elapsed, the temperature detection may not need to be performed before the set time elapses. Therefore, it may be possible to prevent resources from being wasted.

The controller 50 may be configured to detect the temperatures of the on-board charger 300 and the electronic device 130 when the predetermined time period has elapsed after the controller 50 determines that the on-board charger 300 is operating. When the temperature of the on-board charger 300, is determined to be greater than a first set temperature and the temperature of the electronic device 130, is determined to be less than a second set temperature, the controller may be configured to determine that the coolant switching device 200 is malfunctioning, and may be configured to stop the on-board charger 300 from charging a vehicle battery.

The first set temperature and the second set temperature may be different temperatures, and may be reference temperatures calculated through experiments. The second set temperature associated with the electronic device 130 may include a set temperature for the driving motor 140 and a set temperature for the electric power control unit 120. The set temperature for the driving motor 140 and the set temperature for the electric power control unit 120 may be different temperatures which may be calculated through experiments.

A condition in which the temperature of the on-board charger 300 is greater than the first set temperature may indicate that the coolant is not flowing to the second coolant pipe line 20. Further, a condition in which the temperature of the electronic device 130 is less than the second set temperature may indicate that the coolant is flowing to the first coolant pipe line 10. In the latter case, the controller 50 may be configured to determine that supply of the coolant to the second coolant pipe line 20 is prevented due to the sticking of the coolant switching device 200 and may be configured to confirm that the coolant switching device 200 is malfunctioning.

Additionally, the condition in which the temperature of the on-board charger 300 is greater than the first set temperature and the temperature of the electronic device 130 is also greater than the second set temperature may indicate that the coolant is not flowing to the first coolant pipe line 10 and the second coolant pipe line 20. In particular, the controller 50 may be configured to determine a failure of the water pump 100 or lack of the coolant rather than determine failure of the coolant switching device 200.

By comparing the temperatures of the on-board charger 300, the driving motor 140, and the electric power control unit 120, the controller 50 may be configured to stop the on-board charger 300 from charging the vehicle battery when all of the following conditions are satisfied: the temperature of the on-board charger 300 is greater than the first set temperature; the temperature of the driving motor 140 is less than the set temperature for the driving motor 140; and the temperature of the electric power control unit 120 is less than the set temperature for the electric power control unit 120. Alternatively, the controller 50 may be configured to stop the on-board charger 300 from charging the vehicle battery even though all of the conditions are not satisfied. For example, the controller 50 may be configured to stop the on-board charger 300 from charging the vehicle battery under a condition in which the temperature of the on-board charger 300 is compared with only one of the temperature of the driving motor 140 and the temperature of the electric power control unit 120, or under a condition in which the temperature of the on-board charger 300 is compared with a temperature of another electronic device other than the driving motor 140 and the electric power control unit 120. In other words, temperatures which are compared with the temperature of the on-board charger 300 may be arbitrarily determined.

In addition, a water pump 100 may be connected to the first coolant pipe line 10. The controller 50 may be configured to preliminarily determine whether the water pump 100 is operating before determining a failure of the coolant switching device 200. In response to confirming that the water pump 100 is operating, the controller 50 may be configured to detect the temperatures of the on-board charger 300 and the electronic device 130.

Specifically, the operation of the water pump 100 may be determined before the operation of the on-board charger 300 is determined since it may be difficult to determine why the coolant is not supplied to the second pipe line 20 when the water pump 100 does not operate and the coolant does not flow to both of the first coolant pipe line 10 and the second coolant pipe line 20. In other words, it may be difficult to determine the cause of the supply failure of the coolant to the second coolant pipe line 20, the sticking of the coolant switching device 200 or no driving force to cause the coolant to flow. As seen from the above, the determination of whether the coolant switching device 200 is malfunctioning may be made on the assumption that the water pump 100 is operating. That is, the operation state of the water pump 100 may be preliminarily determined to omit certain subsequent processes when the water pump 100 is not operating.

Figure 2:
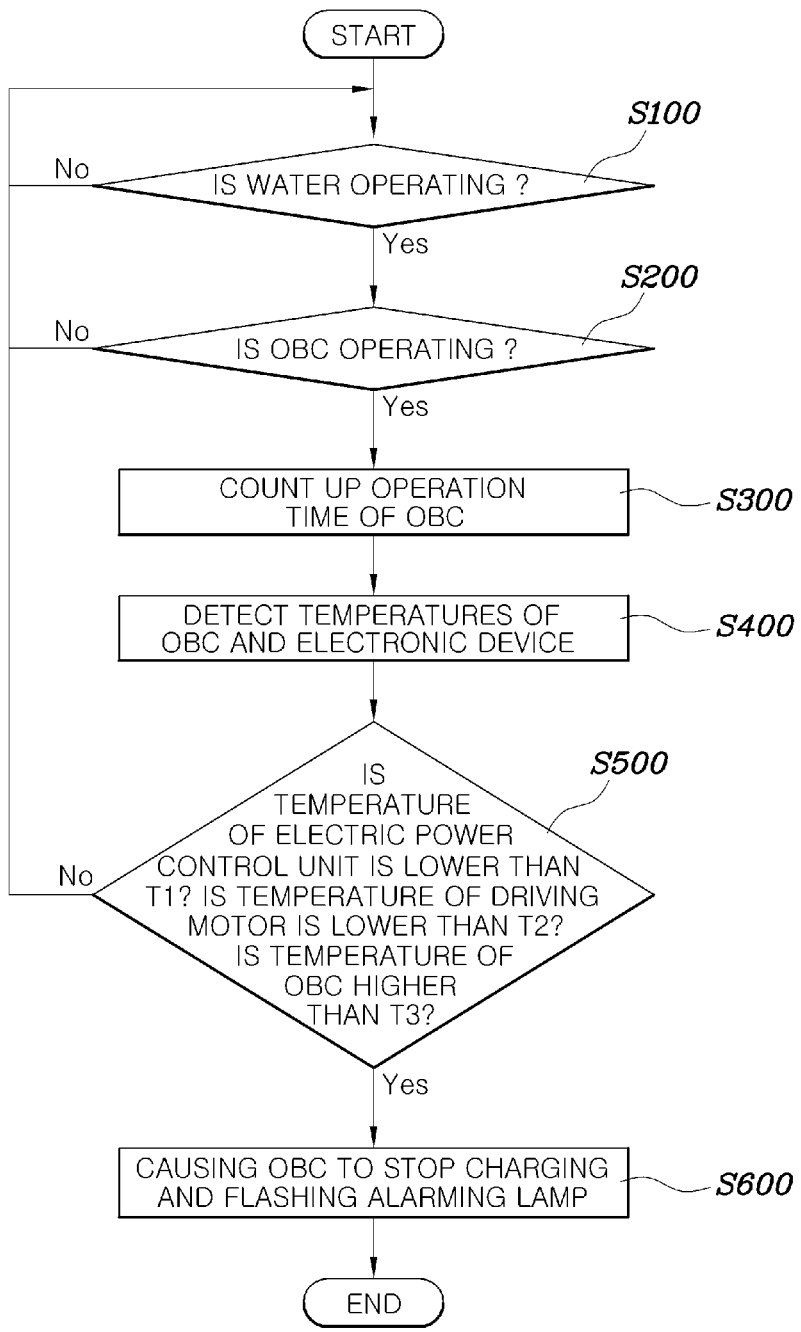
FIG. 2 is an exemplary flowchart illustrating a fault diagnosing method for a coolant switching device for a vehicle according to an exemplary embodiment of the present invention.

Hereinafter a fault diagnosing method for a coolant switching device 200 for a vehicle according to another aspect of the present invention will be described. FIG. 2 is an exemplary flowchart illustrating the fault diagnosing method for diagnosing a fault in the coolant switching device 200 for a vehicle, using the fault diagnosing system described above. The fault diagnosing method as executed by a controller may include a temperature detecting step (Step S400) at which temperatures of the on-board charger 300 and the driving motor 140 are detected, and a fault determining step (Step S500 and Step S600) at which the coolant switching device 200 may be determined to be malfunctioning and the on-board charger 300 may be stopped from charging the vehicle battery when the detected temperature of the on-board charger 300 is greater than a first set temperature and the detected temperature of the driving motor 140 is less than a second set temperature.

In addition, the fault diagnosing method performs a water pump operation checking step (Step S100) by determining whether the water pump 100 is operating, before performing the temperature detecting step, and then may determine whether the on-board charger 300 is operating when it is detected that the water pump 100 is operating.

Furthermore, the failure determining step (Step S500 and Step S600) may be performed. In other words, when the operation of the on-board charger 300 is detected, comparisons may be performed to determine whether the temperature of the on-board charger 300 is greater than the first set temperature, whether the temperature of the driving motor 140 is less than a set temperature for the driving motor, and whether the temperature of the electric power control unit 120 is less than a set temperature for the electric power control unit 120. When all the results of the determinations are affirmative, the coolant switching device 200 may be determined to be malfunctioning, the on-board charger 300 may be stopped from charging the vehicle battery, and a warning signal may be output to a driver.

According to a fault diagnosing system and method for a coolant switching device for a vehicle according to the present invention, it may be possible to determine a failure of the coolant switching device without using an additional sensor or device, which may reduce a system cost and reduce a possibility failure in the coolant switching device, resulting in an improvement in durability of the on-board charger.

Although an exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A fault diagnosing system for a coolant switching device for a vehicle, comprising:
    a first coolant pipe line that passes through an electronic device and a heating device;
    a second coolant pipe line that branches off the first coolant pipe line at a first end thereof, a middle portion of the second coolant pipe line extending to pass through a radiator, a second end of the second coolant pipe line joined with the first coolant pipe line;
    a coolant switching device disposed at a branching point at which the second coolant pipe line branches off the first coolant pipe line;
    an on-board charger configured to charge a vehicle battery and disposed on the second coolant pipe line between the coolant switching device and the radiator; and
    a controller configured to determine a failure of the coolant switching device and stop the on-board charger from charging the vehicle battery, when a temperature of the on-board charger is greater than a first set temperature and a temperature of the electronic device is less than a second set temperature.

2. The fault diagnosing system according to claim 1, wherein the electronic device includes a driving motor and an electric power control unit of a vehicle.

3. The fault diagnosing system according to claim 2, wherein the second set temperature associated with the electronic device includes a set temperature for the driving motor and a set temperature for the electric power control unit, wherein the set temperature for the driving motor is different from the set temperature for the electric power control unit.

4. The fault diagnosing system according to claim 1, wherein the controller is configured to:
    determine whether the on-board charger is operating before determining a failure of the coolant switching device; and
    detect temperatures of the on-board charger and the electronic device when operation of the on-board charger is determined.

5. The fault diagnosing system according to claim 4, wherein the controller is configured to detect the temperatures of the on-board charger and the electronic device after a predetermined time period has elapsed when the operation of the on-board charger is determined.

6. The fault diagnosing system according to claim 1, further comprising:
    a water pump connected to the first coolant pipe line, wherein the controller is configured to preliminarily determine whether the water pump is operating before determining a failure of the coolant switching device, and detect temperatures of the on-board charger and the electronic device when operation of the water pump is determined.

7. A fault diagnosing method using the fault diagnosing system according to claim 1, the fault diagnosing method comprising:
    detecting, by a controller, temperatures of the on-board charger and the driving motor;
    determining, by the controller, a failure of a coolant switching device; and
    stopping, by the controller, the on-board charger from charging the vehicle battery when the detected temperature of the on-board charger is greater than the first set temperature and the detected temperature of the driving motor is less than the second set temperature.

8. The fault diagnosing method according to claim 7, further comprising:
    determining, by the controller, whether a water pump is operating before the detecting of the temperatures.

9. The fault diagnosing method according to claim 7, wherein the second set temperature associated with an electronic device includes a set temperature for the driving motor and a set temperature for an electric power control unit, wherein the set temperature for the driving motor is different from the set temperature for the electric power control unit.

10. A non-transitory computer readable medium containing program instructions executed by a controller, the computer readable medium comprising:
    program instructions that detect temperatures of an on-board charger and a driving motor;
    program instructions that determine a failure of a coolant switching device; and
    program instructions that stop the on-board charger from charging a vehicle battery when the detected temperature of the on-board charger is greater than a first set temperature and the detected temperature of the driving motor is less than a second set temperature.

11. The non-transitory computer readable medium of claim 10, further comprising:
    program instructions that determine whether a water pump is operating before the detecting of the temperatures.

12. The non-transitory computer readable medium of claim 10, wherein the second set temperature associated with an electronic device includes a set temperature for the driving motor and a set temperature for an electric power control unit, wherein the set temperature for the driving motor is different from the set temperature for the electric power control unit.

* * * * *